April 29, 1958 V. F. MORIN 2,832,840

MEANS AND TECHNIQUES FOR VISUALLY INDICATING EDITING POSITION ON FILM

Filed Jan. 19, 1953

VOLNEY F. MORIN
INVENTOR.

BY Lyon & Lyon

ATTORNEYS

United States Patent Office 2,832,840

Patented Apr. 29, 1958

2,832,840

MEANS AND TECHNIQUES FOR VISUALLY INDICATING EDITING POSITION ON FILM

Volney F. Morin, Los Angeles, Calif., assignor to Technicolor Motion Picture Corporation, Hollywood, Calif., a corporation of Maine Application January 19, 1953, Serial No. 332,061

12 Claims. (Cl. 179—100.2)

The present invention relates to means and techniques for locating recorded information on a recording medium and more specifically relates to a new method and means for producing a still visual picture of information recorded on a selected portion of a recording medium, such information being a recording of sound, video, or other electrical characteristic.

The invention involves the use of a cathode ray tube having deflecting means and time base sweep producing means for producing a still visual indication of recorded information on a selected portion of a recorded medium which is in cooperative relationship with a transducer, i. e., a pickup head; and involves producing relative movement recurrently between such selected portion of the recording medium and a transducer to effect a recurrent scanning of such selected portion by such transducer, transferring the output of the transducer to the beam deflecting means of the cathode tube and simultaneously operating the sweep producing means of the cathode tube in synchronism with such scanning of the selected portion of the recording medium.

It is therefore a general object of the present invention to provide means and techniques for accomplishing the above indicated functions and results.

A specific objective of the present invention is to provide approved means and techniques by which a film editor may visually and accurately determine the precise point on a piece of film where he is required to make an identifying mark or cut.

Another specific objective of the present invention is to provide means and techniques of this character which does not require, for the practice thereof, writing on the film which is being edited, since writing on film has proven unsatisfactory for many reasons, one of which involves the time required for the ink to dry, and the possibility that the writing medium may warp or curl the film; and further which does not require, for the practice thereof, chemical development of indicia placed or photographed on the film.

The features of the present invention which are believed to be novel are set forth particularly in the appended claims. This invention itself, both as to its organization and manner of operation, together with further objects and advantages thereof, may be best understood by reference to the following description taken in connection with the accompanying drawings in which:

Figure 1:
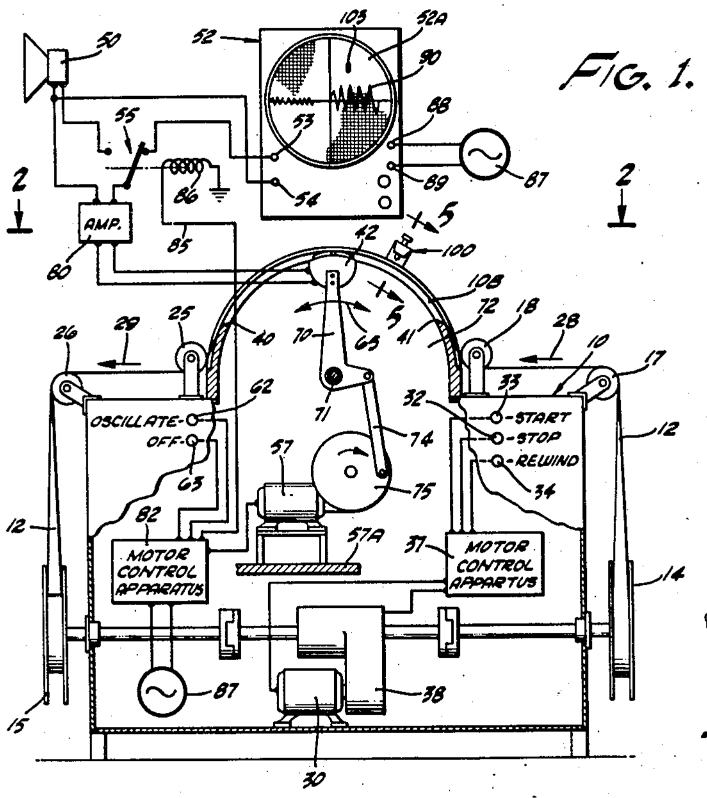
Figure 1 is a view of apparatus embodying the present invention for accomplishing a new method, the function and results of the invention.

Referring to the drawings, Figure 1 shows a table 10 upon which film or tape 12 having one or more magnetic sound tracks thereon may be run in either direction, i. e., a forward direction or a reverse direction.

Figure 2:
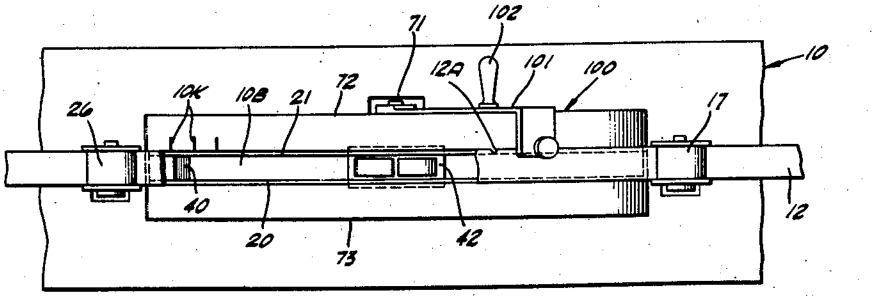
Figure 2 is a view taken in the direction indicated by the arrows 2—2 in Figure 1.

Film 12 extends from the supply reel 14 to the take-up reel 15 and in the passage from such supply reel 14 to said take-up reel 15 moves over, in turn, the following elements: film guide rollers 17 and 18, spaced circular flanges or lips 20, 21 (Figure 2) on the table 10, and the film guide rollers 25 and 26, all of such film guide rollers 17, 18, 25 and 26 being rotatably supported on the table 10.

The film 12 may be driven in the forward direction indicated by the arrows 28, 29 or driven in the reverse direction by the reversible film driving motor 30. For that purpose the motor 30 is controlled by conventional apparatus 37 involving relays and so forth, so that the output shaft of the motor 30 may be stopped by operation of the conventional "stop" pushbutton 32, or driven in the forward direction upon pressing the "start" pushbutton 33, or rotated in the opposite or rewind direction upon pushing the "rewind" pushbutton 34. Since such motor control apparatus 37 is conventional and per se forms no part of the present invention, a detailed description of the same is considered unnecessary here.

The output shaft of the motor 30 is coupled through selective conventional gearing and clutches for reeling or rewinding of the film 12, and since such apparatus is conventional and forms, per se, no part of the present invention, it is designated as such in Figure 1 and has the reference numeral 38. The clutches in such apparatus 38 may be controlled electrically in accordance with the energization of relays in the apparatus designated as 37.

It is clear that the film 12 may be driven in either forward direction or reverse direction so that any selected portion of such film 12 may be accurately positioned between the ends of the film guide channel 10B, such ends being designated by reference numerals 40 and 41.

The transducer means 42 is cooperatively associated with the film or tape 12 and serves as a magnetic pickup head for producing an electric voltage of such characteristics and frequency as determined by the recording on the particular channel on the film or tape 12. Such voltage produced by the transducer 42 after amplification in amplifier 80, may be transferred alternately to the sound reproducer or speaker 50, or to beam deflecting element of the cathode ray oscillograph 52 which has terminals 53 and 54. Normally, while the film 12 travels in the forward direction indicated by the arrow 28 voltages developed by the transducer 42 are applied through the relay controlled single pole double throw switch 55 to the speaker 50; but, when the motor 57 is energized by means described hereinafter to oscillate the transducer 42 (with the film 12 remaining stationary), the voltage developed by the transducer 42 is automatically applied to the terminals 53, 54 of the beam deflecting element to produce vertical deflections of the cathode ray beam.

Since the control apparatus 82 for the motor 57 which is mounted on the table shelf 57A is conventional and per se forms no part of the present invention, it is represented generally herein.

Such control apparatus 82 serves to either energize the motor 57 or to de-energize the same, depending on whether the so-called "oscillate" pushbutton 62 or "off" pushbutton 63 is depressed.

The motor 57 when energized serves to oscillate the transducer 42 as indicated by the arrows 65 within the limits indicated at 40, 41. For that purpose, the transducer 42 is mounted on the end of the bell crank 70 which is journaled for rotation on the shaft 71 having its opposite ends mounted in the side walls 72, 73 of the table. The other arm of the bell crank 70 is connected to one end of the rod 74 having its other end connected to the crank 75 which is shown in the form of a disk and which is rotated upon rotation of the motor 57. The connection of the rod 74 to the bell crank 70, on the one hand, and to the crank 75, on the other hand, may be by means of pins passing through lost motion slots in the rod 74 so that the desired reciprocal movement of the bell crank 70 is effected upon energization of the motor, or for that purpose other means may be used to effect a reciprocation of the transducer 42.

In operation of the arrangement shown in Figure 1, normally the single pole double throw switch 55 is in a position to energize the speaker 50, and the operator or editor may listen to the recording on the sound track of the film or tape 12 upon pressing the "start" button 33 in which case the film travels in the direction indicated by the arrows 28, 29 to induce voltages in the transducer 42 which, at this particular time, is stationary since it is assumed that the "off" button 63 has been previously depressed. The voltage variations after amplification in the amplifier 80 are thus impressed on the speaker and the operator or editor listens to the recording. In the event that he wishes to mark, cut or produce any other indicia on the film at selected points thereon, he positions the desired section of film within the limits indicated at 40 and 41. This he may do by operating the "start," "stop" or "rewind" buttons 32, 33 and 34, listening in the meantime to the recording and developing and getting a general idea as to where the cut or marking should be made. In order to locate the exact location where the cut or marking should be made, the motor 57 is energized (assuming the film 12 to be stationary) by operating the oscillate button 62. Upon operating the "oscillate" button 62, a voltage is developed on the lead 85 to energize the relay winding 86 thereby to cause the output of the amplifier 80 to be applied to the terminals 53, 54 of the beam deflecting element of the oscilloscope 52.

The cathode ray oscilloscope 52 is conventional and a description of the detailed circuitry of the same is therefore considered unnecessary. The cathode ray oscilloscope 52 includes of course, conventional time base sweep generating means for periodically deflecting the cathode beam horizontally to develop a horizontal line or sweep on the screen 52A of the oscilloscope, which appears visible since it is developed at a high rate, i. e. more than sixteen times per second. The operation of the time base sweep circuitry is controlled in timed relationship, or synchronized with the alternations of the alternating voltage source 87 which is connected to the terminals 88, 89. This source 87 serves also to energize the synchronous motor 57 so that rotation of the motor 57 is in timed relationship or in synchronism with the development of time base sweeps. Consequently, when and as the transducer 42 is oscillated (with the tape 12 of course stationary), a still representation 90 of the recording on the magentizable tape 12 is produced.

More specifically, the time base sweep circuitry is synchronized with the movement of the transducer 42 such that at the time the transducer 42 is closest to the end 40 of the film channel 10B, the cathode ray beam begins its horizontal sweep; and, when the transducer 42 is at the other end 41 of the film channel 10B, the cathode ray beam has completed its horizontal sweep. Thus, under these conditions, as explained previously, a still picture or representation 90 is produced on the face of the cathode ray tube and the operator or editor, having obtained a visual picture, may accurately determine where the cut or marking should be made.

Figure 5:
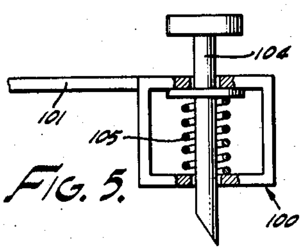
Figure 5 is a sectional view taken substantially on the line 5—5 of Figure 1.

In order, however, to more accurately locate the spot where the cut or marking is to be made, there is provided a magnet 100 which is mounted on the free end of the manually positionable lever 101 which has a handle 102. The inner end of the lever 101 is rotatably mounted on the aforementioned shaft 71 so that it may be swung about the same axis as the transducer 42. Since the element 100 is a magnet, a voltage is induced in the transducer 42 when the transducer 42 moves past the same. Accordingly, this voltage produces a mark or image 103 on the face of the cathode ray screen. It is obvious that the position of this image 103 may be superimposed on the presentation 90 or displaced therefrom, depending on the relative position of the magnet 100 with respect to the sound track on the tape 12. The operator or editor may then, by comparing the image 103 with the representation 90 move the lever 101 to a position corresponding to the point where he would like to make a cut or marking; and once he has reached that point, he may effect a cutting by depressing the punch 104 which produces a cut on the edge of the film or tape 12 as indicated at 12A in Figure 2. The punch 104 is spring biased in an upward position by the compression spring 105 as shown in Figure 5.

Figure 3:
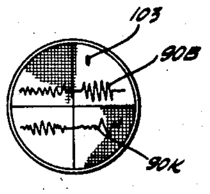
Figure 3 shows the viewing face of a cathode ray tube having a plurality of presentations thereon which are produced by duplicating certain portions of the apparatus shown in Figure 1 in accordance with features and teachings of the present invention.

It is understood that certain of the apparatus shown herein may be duplicated, using the teachings and principles herein to visually represent, in still form, a plurality of recordings in adjacent channels on the same film or tape. This result is indicated in Figure 3 where the recordings on two separate sound channels are shown visually simultaneously at 90A and 90B respectively. In such case the apparatus is provided with two laterally spaced transducers 42 and a cathode ray oscilloscope of the dual beam type is used.

Figure 4:
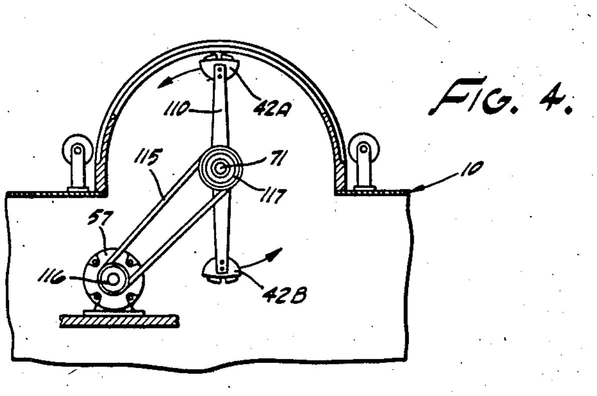
Figure 4 is a view of modified apparatus which may be substituted for corresponding apparatus illustrated in Figure 1.

Referring to Figure 4, instead of oscillating a single transducer or pickup 42, a pair of transducers 42A, 42B mounted on opposite ends of the rotatable arm 110 may be continuously rotated by the synchronous motor 57. In order to prevent slippage, a chain belt 115 passes over sprocket wheels 116 and 117 mounted respectively on the shaft of the motor 57 and the arm 110. The voltage developed in such transducers 42A, 42B in their continuous rotation may be applied through conventional slip rings mounted on the shaft 71 and rotating with the arm 110 to the input of the amplifier 80.

Preferably the rollers 17 and 26 are drive sprockets, to assure movement of the film over the head 10B at a continuous rate, even though the relative amounts of film on the feed reel 14 or take up reel 15 change.

It is, of course, also within the scope of the present invention, to produce the aforementioned relative movement between film and transducer by maintaining the transducer or head 42 while the film moves past the same. In this instance the sound is heard and the moving pattern appears on the oscilloscope screen. Also, in such instance while the film runs past the stationary head the film editor may make, for example, a continuous wax marking on the film by depressing the pointer 104 which may carry a wax crayon.

Further, provisions may be made for hearing the sound while simultaneously viewing the stationary pattern on the oscilloscope screen.

The screen of the oscilloscope has a series of horizontally spaced lines intersecting a series of vertically spaced lines in a grid arrangement for reference purposes. The horizontally spaced lines may be related to commensurate markings or indicia 10K (Fig. 2) adjacent the film channel 10B. Then, when the film editor sees the particular portion he is interested in on the face of the cathode ray tube, he may mark the recording medium with a wax pencil by correlation of the grid marking on the screen with the corresponding marking 10K.

Also, the punch 104 (Fig. 5) need not necessarily be associated with the magnet 100. But, position of the lever 101 may be indicated on the screen by other means, for example, the lever 101 may be connected mechanically to a rotatable arm of a potentiometer with the rotatable arm thus being connected electrically to a tap on the potentiometer resistance strip for developing a voltage representative of the position of the arm 101, such voltage being applied to the oscilloscope to effect a visible representation on the screen as to the position of the arm 101.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a device of the character described for locating recorded information on a recording medium, transducer means, means mounting said transducer means in cooperative relationship with a selected portion of said recording medium, means producing recurrent movement between said selected portion of said medium and said transducer to produce a recurrent scanning of said selected portion by said transducer, visual indicating means including cathode ray beam deflecting means and means for producing a time base sweep, means producing said time base sweep synchronously with said relative movement, means coupling said transducer means to said deflecting means to produce deflections which form a visual representation of recordings on said selected portion, an element, means positioning said element with respect to said recording medium, said element developing a magnetic field which cooperates magnetically with said transducer to induce a voltage in said transducer in accordance with the position of said element, said coupling means serving to apply said voltage to said deflecting means.

2. An arrangement set forth in claim 1 in which said element comprises a movable magnet cooperating magnetically with said transducer for producing a visual indication on said indicating means which may be compared with portions of said visual representation.

3. The arrangement set forth in claim 1 in which said magnetic means has means associated and positioned therewith for producing a marking on said recording medium.

4. In an arrangement of the character described, the subcombination comprising a stationary recording medium having a recording thereon, a transducer, a manually positionable magnetic means producing a magnetic field, means mounting said magnetic means in cooperative magnetic relationship with said transducer, and means cyclically and repeatedly moving said transducer past said recording medium and said magnetic means in cooperative magnetic relationship to the same to develop cyclically varying voltages representative of said recording in relationship to the position of said magnetic means.

5. The arrangement set forth in claim 4 in which the last-mentioned means incorporates means for moving said transducer with an oscillatory movement.

6. The arrangement set forth in claim 4 in which the last-mentioned means comprises a rotating shaft, and means driven by said shaft to impart a rotary movement to said transducer.

7. In an arrangement of the character described, a film support for supporting magnetizing film, a transducer, means cyclically and repeatedly moving said transducer along and adjacent said film support, a magnetic element developing a magnetic field, and means mounting said magnetic element for movement to adjusted positions along and adjacent said film support and in magnetic cooperative relationship with said transducer whereby movement of said transducer develops voltages representative both of said recording and the relative position of said magnetic element.

8. The arrangement set forth in claim 7 in which said film support is partially circular with respect to a predetermined axis, and said transducer and said magnetic element are both mounted for independent arcuate movement about said axis.

9. The arrangement set forth in claim 7 including indicating means, means coupling said indicating means to said transducer to impress said voltages on said indicating means, means operating said indicating means in timed relationship with said transducer moving means for indicating both the character of the recording on a film in said support and the position of said magnetic element.

10. In an arrangement of the character described, a recording medium having a recording thereon, a magnetic element, means mounting said magnetic element adjacent said recording medium, a transducer, means mounting said transducer in magnetic cooperative relationship with said recording medium and said magnetic element, means producing relative cyclical movement between, on the one hand, said transducer, and, on the other hand, a selected portion of said recording medium and said magnetic element to develop a cyclical variation in voltage representative of the recording on said selected portion in relationship to the position of said element, indicating means responsive to said voltage and coupled to said transducer, and means operating said indicating means synchronously with said movement producing means for producing a still visual representation of said recording in relationship to said element.

11. The arrangement set forth in claim 10 including means for moving said element with respect to said medium.

12. In an arrangement of the character described, a film support, means moving film relative to said support, a transducer, means mounting said transducer normally stationary with respect to said support in magnetic relationship to film in said support, indicating means coupled to said transducer for reproducing said recording, means for disabling said film moving means whereby said film remains stationary with respect to said support, a magnetic element developing a magnetic field, means mounting said magnetic element adjacent said film support in magnetic relationship to said transducer, means repeatedly and cyclically moving said transducer past and along said film support and through said magnetic field of said magnetic element to develop a cyclical voltage variation representative of the recording on the stationary film in relationship to the position of said element, and means operating said indicating means in synchronism with said transducer moving means for producing a visual representation of said recording and the position of said magnetic element.

References Cited in the file of this patent

UNITED STATES PATENTS

| | | |
|---|---|---|
| 2,528,699 | Masterson | Nov. 7, 1950 |
| 2,611,828 | Gunby | Sept. 23, 1952 |
| 2,647,168 | Rivas | July 28, 1953 |